May 31, 1966  J. N. MORAN  3,253,413
MEANS FOR CHANGING THE ANGULAR RELATIONSHIP
OF ROTATING COAXIAL MEMBERS
Filed March 12, 1962  8 Sheets-Sheet 1

INVENTOR.
J. N. MORAN

BY Young & Quigg

ATTORNEYS

INVENTOR.
J.N. MORAN

BY Young & Quigg

ATTORNEYS

May 31, 1966 J. N. MORAN 3,253,413
MEANS FOR CHANGING THE ANGULAR RELATIONSHIP
OF ROTATING COAXIAL MEMBERS
Filed March 12, 1962 8 Sheets-Sheet 5

INVENTOR.
J.N. MORAN
BY Young & Quigg

ATTORNEYS

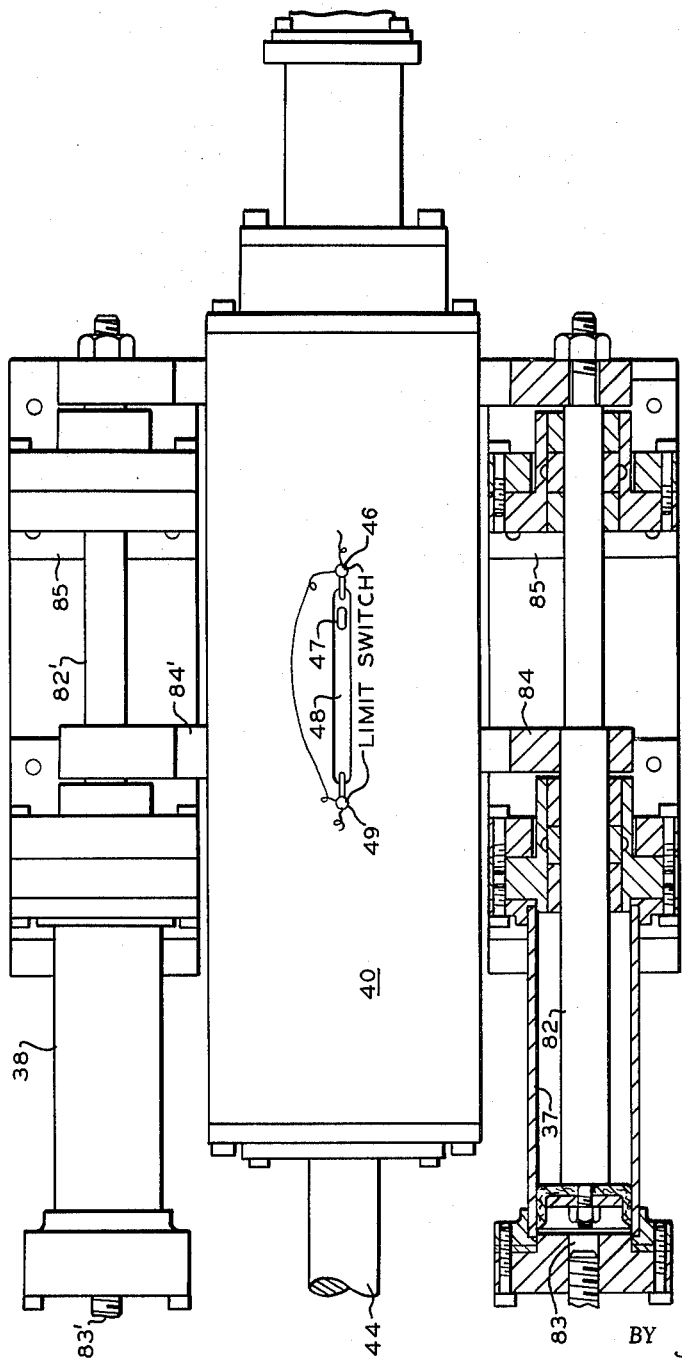

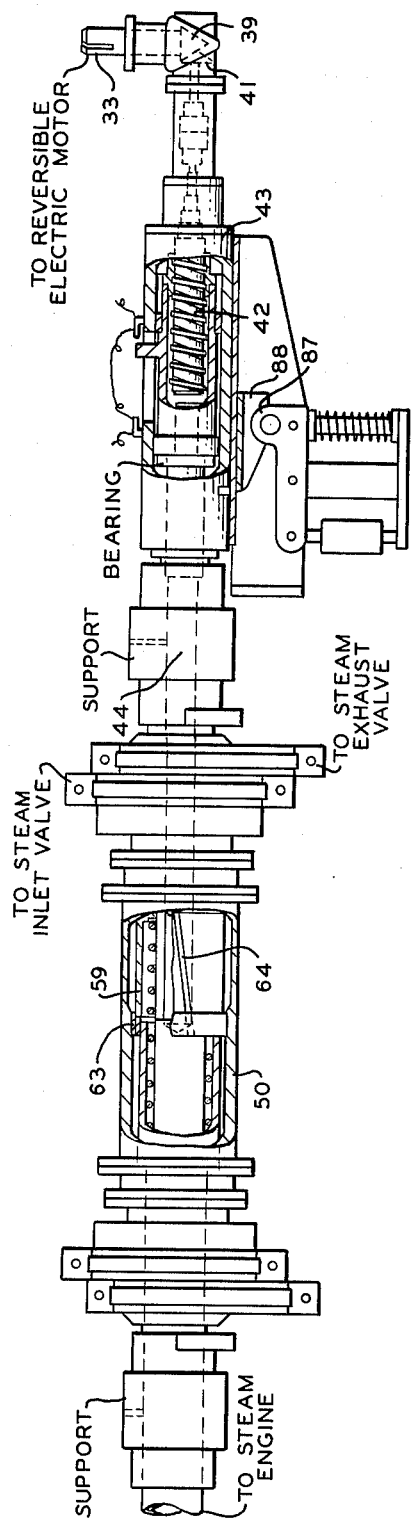

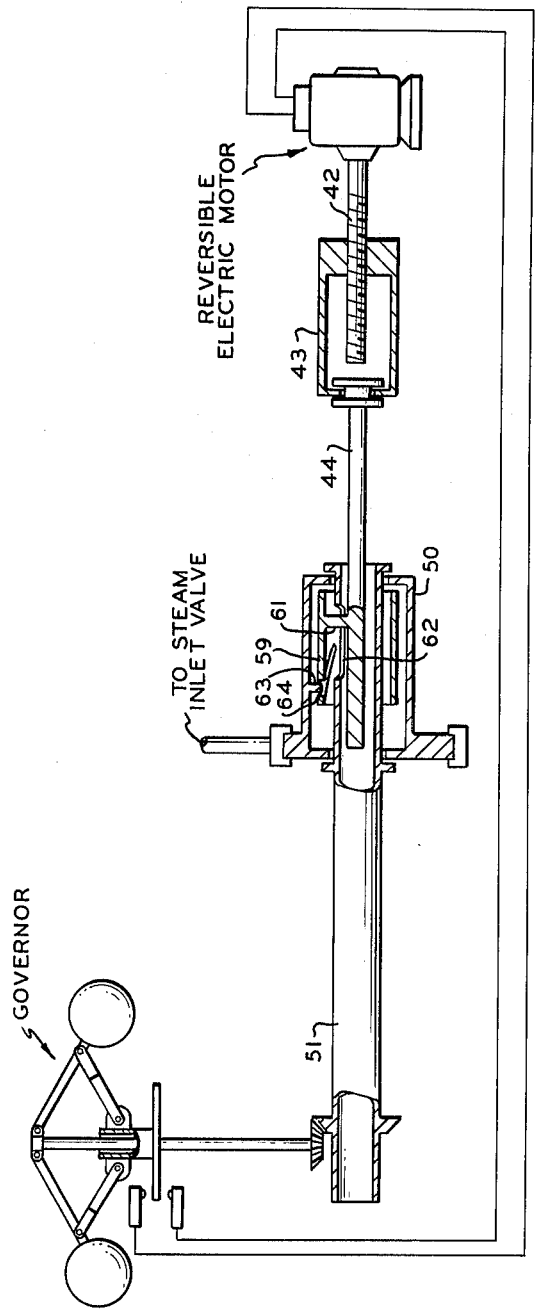

United States Patent Office 3,253,413
Patented May 31, 1966

3,253,413
MEANS FOR CHANGING THE ANGULAR RELA-
TIONSHIP OF ROTATING COAXIAL MEMBERS
Jesse N. Moran, Bartlesville, Okla., assignor to Phillips
Petroleum Company, a corporation of Delaware
Filed Mar. 12, 1962, Ser. No. 179,007
6 Claims. (Cl. 60—97)

This invention relates to a method and means for changing the angular relationship of coaxial members, particularly coaxial members which are rotating at the same speed. In another aspect this invention relates to a method and means for effecting a limited amount of relative rotation, or angular motion of one of two coaxial members rotating at the same speed. In still another aspect this invention relates to a method and means for increasing or decreasing simultaneously and by the same amount the speed of a plurality of engines. In one of its more specific aspects this invention relates to a method and means for controlling the speed of a plurality of reciprocating steam engines from a single governor.

In the use of separate engines in dual or multiple operation in combination as a single power source, it is necessary to maintain the synchronism of the engines as their speeds are increased or decreased. It is desirable that the control of the speed of the engines be accomplished from a common source. It is desirable to manipulate the steam inlet valve on a steam engine without changing the position or timing of the steam exhaust valve, however, this presents a problem when these valves are operated from a common lay shaft or crank shaft.

It is therefore a principal object of this invention to provide a method and means for controlling the steam inlet valves of a plurality of synchronized reciprocating steam engines from a single source. It is also an object of this invention to provide a method and means for changing the angular relationship of two coaxial tubular members that are rotating at the same speed. A further object of this invention is to provide a method and means for converting rotational motion of a first member to linear motion of a second member and then converting the linear motion of the second member to rotational motion in a third member. Other objects and advantages will be apparent to one skilled in the art upon studying this disclosure including a detailed description of the invention including the drawing wherein:

FIGURE 7 is a plan view, partly in section, of the section of the assembly of FIGURE 2;

FIGURE 8 is a view, partly in section, of the assembly of FIGURE 6; and

FIGURE 9 is a schematic view, partly in section, of the essential elements of the invention.

Figure 1:
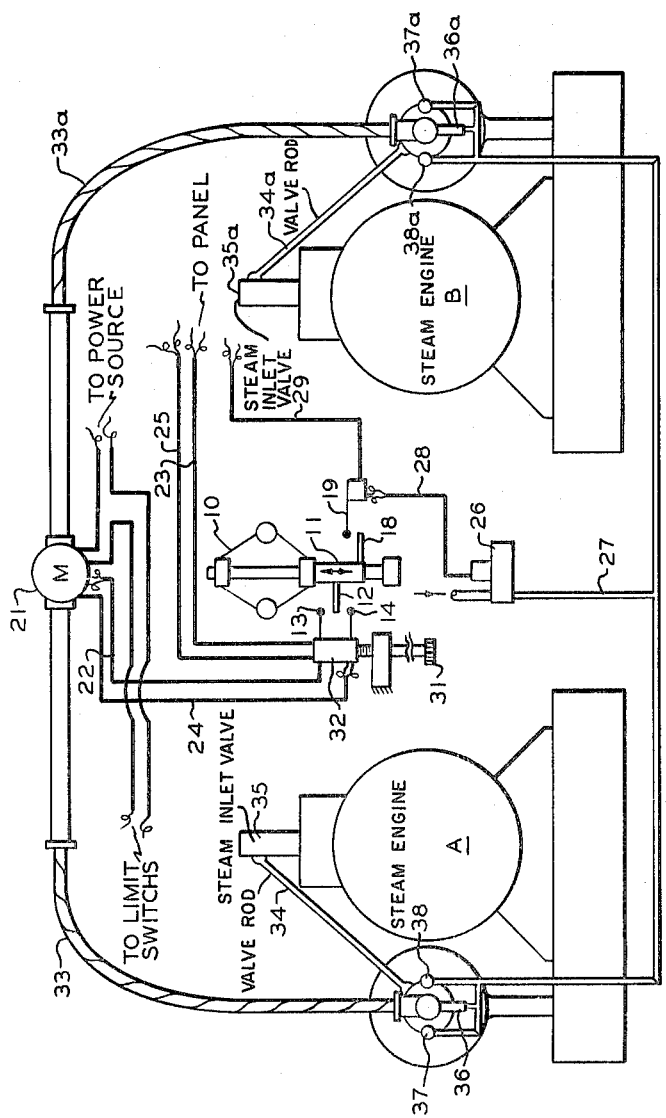
FIGURE 1 is a schematic diagram of two steam engines having the synchronized speed control of my invention incorporated therein.

In FIGURE 1 of the drawing two engines, A and B, are shown; however, more than two engines can be controlled by the system of the invention. The mechanical governor 10 is driven by a gear drive or a timing belt drive (not shown) from the lay-shaft of either engine A or B. The drive yoke 11 of governor 10 carries contactor 12 which operates normally open switch 13 to reduce engine speed and which operates normally open switch 14 to increase engine speed. Contactor 18 on yoke 11 operates normally open switch 19 to stop all of the engines in case of uncontrolled acceleration, etc. The circuits containing switches 13, 14 and 19 can also be activated or deactivated manually from a panel (not shown). Switch 13 is connected to motor 21 by a pair of electrical wires in conduit 22 and can be connected to the panel by a pair of wires in conduit 23. Switch 14 is connected to motor 21 by a pair of wires in conduit 24 and can be connected to the panel by a pair of wires in conduit 25. Switch 19 is connected to a solenoid valve 26 in compressed air conduit 27 by a pair of wires in conduit 28 and can be connected to the panel by a pair of wires in conduit 29.

The range of engine speed within which the governor 10 controls can be varied by rotating knurled knob 31 so that the housing 32, which carries switches 13 and 14, is raised and lowered.

Motor 21 is connected to the controlling device of engine A by a flexible shaft 33 and is connected to the control mechanism of engine B by a similar flexible shaft 33a. The control mechanisms manipulate valve rods 34 and 34a of engines A and B, respectively, to change the settings of the steam inlet valves 35 and 35a of engines A and B, respectively. The control mechanism is hereafter described in greater detail.

Solenoid valve 26, when actuated by switch 19, admits compressed air to air cylinders 36, 37 and 38 of engine A and corresponding air cylinders 36a, 37a and 38a of engine B so as to close the steam inlet valves 35 and 35a as hereinafter more fully described.

Figure 2:
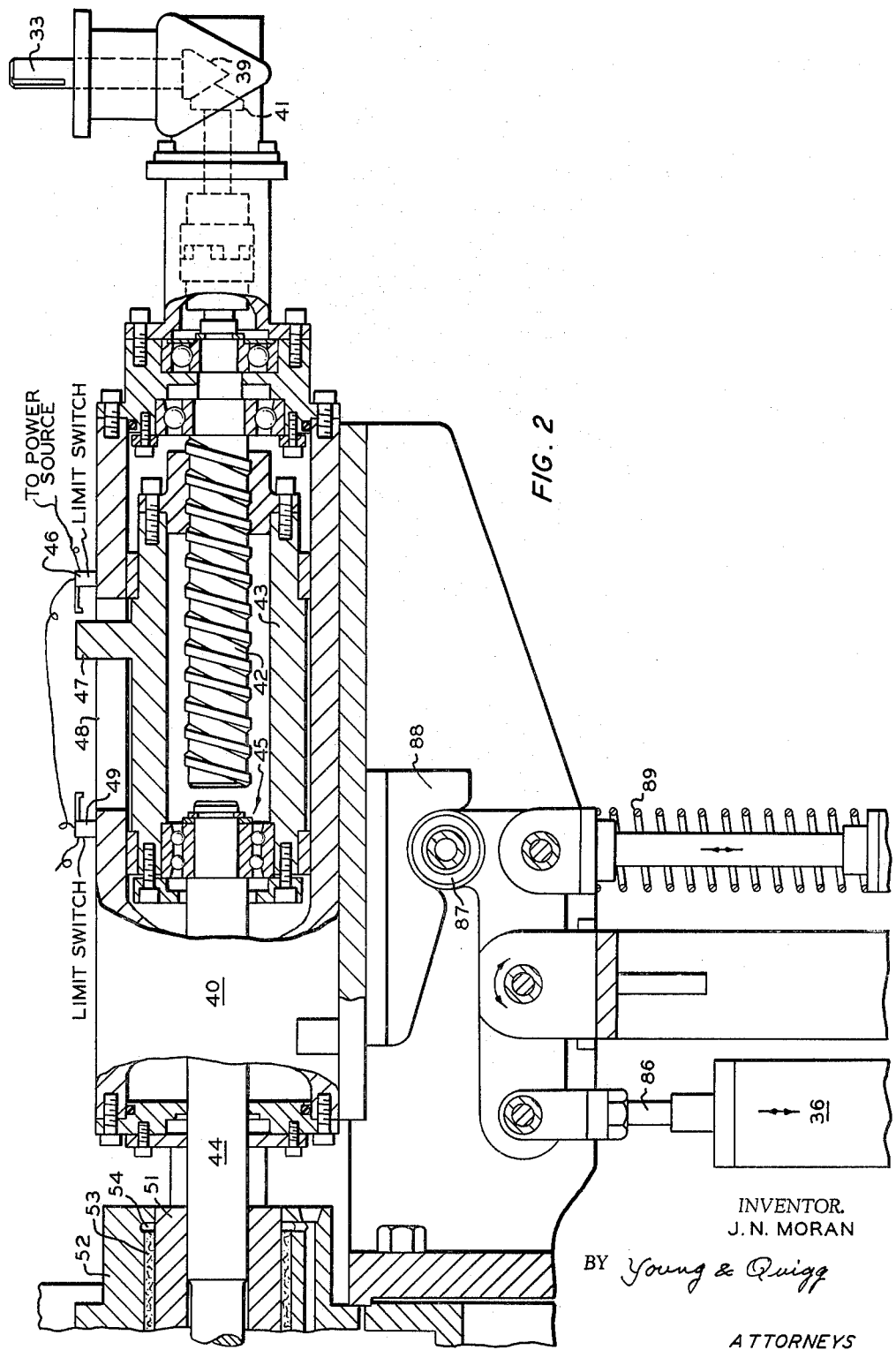
FIGURE 2 is an elevation view, partly in section, of the device for converting rotational motion to longitudinal motion.

Referring now to FIGURE 2, flexible cable 33 (FIGURE 1) operates gears 39 and 41 to rotate threaded shaft 42 in converter housing 40. Sleeve 43 carries inside threads matching those of shaft 42 so that the sleeve is moved linearly within housing 40 when shaft 42 is rotated. The end of lay shaft 44 is rotatably secured in sleeve 43 by bearing assembly 45 so that lay shaft 44 is moved linearly, while rotating, as sleeve 43 is moved linearly. Motor 21 is stopped by limit switch 46 being opened by contactor 47 in slot 48 of housing 40 and by opening limit switch 49 at the required extent of linear travel of sleeve 43 in each direction. Although less preferable, the gear or pinion 39 can operate a geared rack longitudinally disposed on the sleeve 43 in the manner of a conventional rack and pinion.

Figure 3:
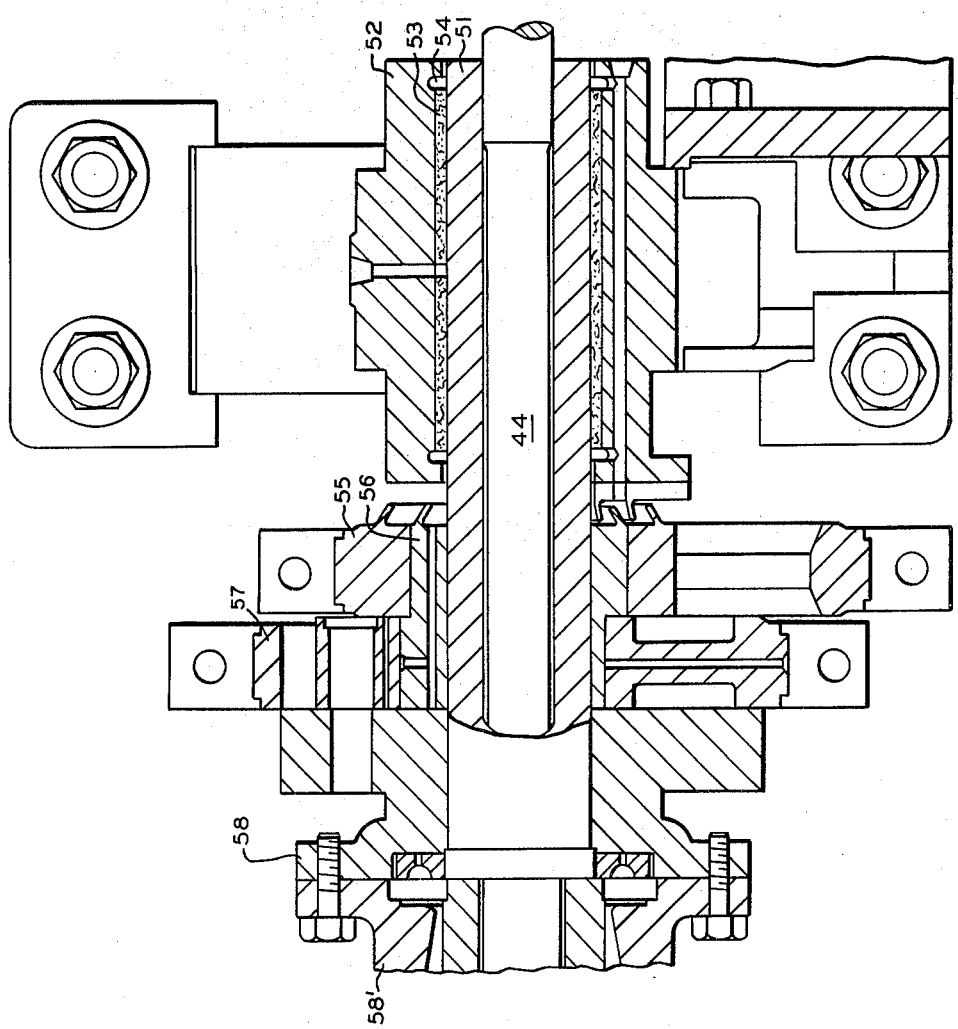
FIGURE 3 is an elevational view of the section of the lay-shaft assembly to the left of the view of FIGURE 2, showing one set of steam inlet and exhaust valve eccentrics for a steam engine.

Referring now to FIGURE 3, which connects to the left side of FIGURE 2, lay shaft 44 and lay shaft sleeve 51 rotate in supporting bearing 52 containing packing 53. Packing 53 is lubricated via oil gland 54. Steam exhaust valve eccentric 55 is secured to lay shaft sleeve 51 so as to rotate fixedly with lay shaft sleeve 51 on eccentric 56. Steam inlet valve eccentric follower 57 is rotatably mounted on eccentric 56 and is secured by means of bolted flange 58 and 58' to housing 50 (FIGURE 4).

Figure 4:
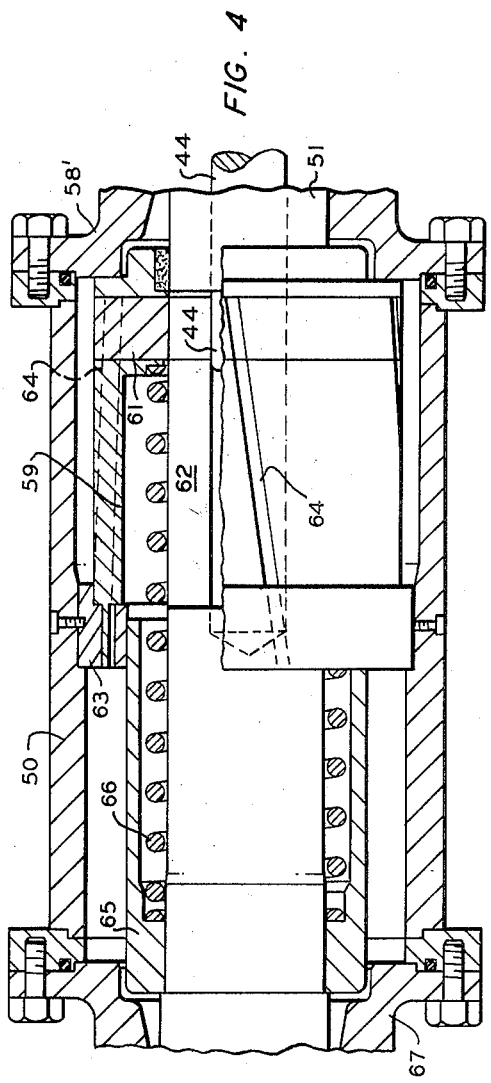
FIGURE 4 is an elevational view, partly in section, of the telescoping section of the lay-shaft to the left of the view of FIGURE 3, showing the device for converting longitudinal motion to rotational motion.

Referring now to FIGURE 4, housing 50 contains a sleeve 59 which is secured to the end of lay shaft 44 by a key member 61 which travels in keyway 62 of lay shaft sleeve 51. Sleeve 59 is rotatably connected to housing 50 by pin or key 63 which travels in spiral groove or keyway 64 as the shaft 44 is moved linearly so as to rotate housing 50 through an arc of about 19 degrees with respect to lay shaft sleeve 51 and lay shaft 44 whereby the steam inlet valve eccentric follower 57 is rotated on eccentric 56 so as to change the setting of steam valve 35. Sleeve 59 and housing 50 can be splined together by a spiral spline assembly. The speed of engine A is thus increased or decreased and the speed of engine B is simultaneously increased or decreased the same amount. As sleeve 59 is moved to the left, it is telescoped over spring retaining sleeve 65 which is secured to lay shaft sleeve 51 and secures spring 66 which is compressed as sleeve 59 is moved to the left.

Figure 5:
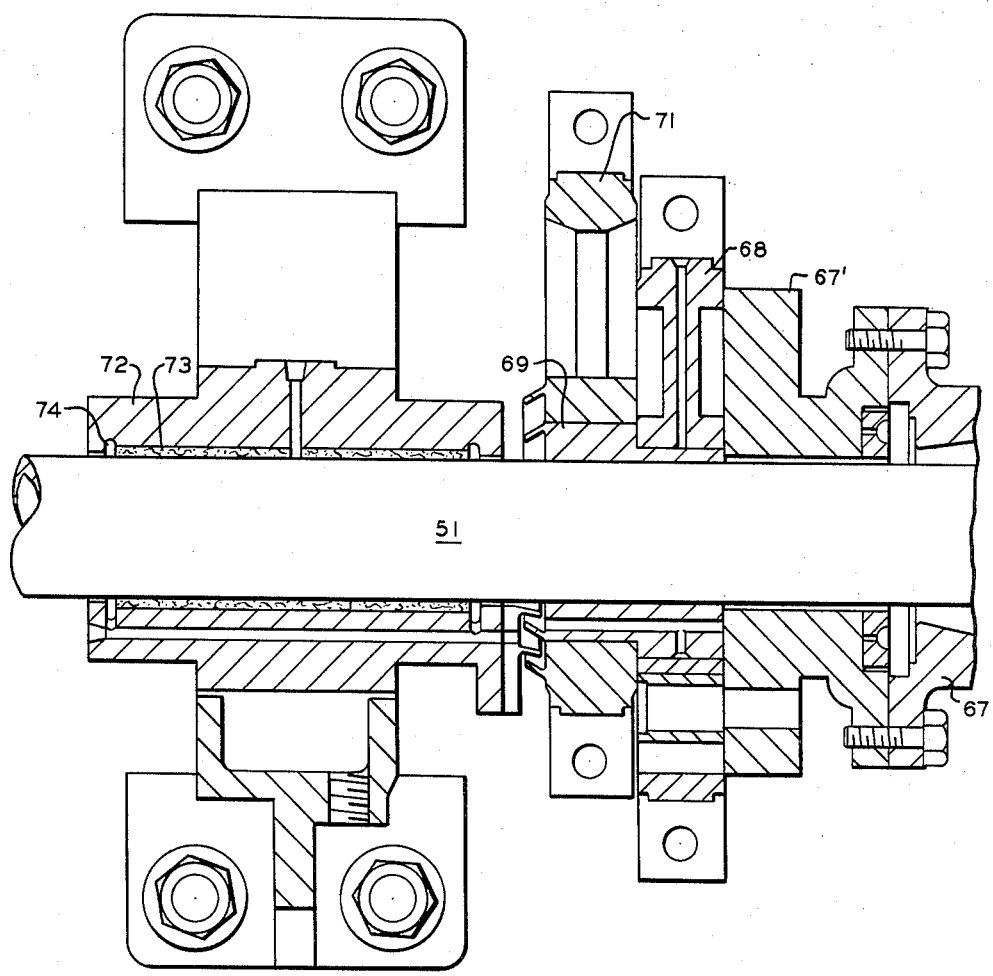
FIGURE 5 is an elevational view of the section of the lay-shaft assembly to the left of the view of FIGURE 4 showing another set of steam inlet and exhaust valve eccentrics for the steam engine.

Referring now to FIGURE 5, the housing 50 (FIGURE 4) is secured by bolted flange 67 and 67' to inlet steam valve eccentric follower 68. Steam inlet valve eccentric follower 68 is rotatably mounted on eccentric 69 which also carries fixedly thereon exhaust eccentric 71. Eccentric 69 is secured to lay shaft sleeve 51 which is rotatably supported in bearing 72, containing packing 73. An oil gland system utilized to lubricate packing 73 is indicated at 74.

Figure 6:
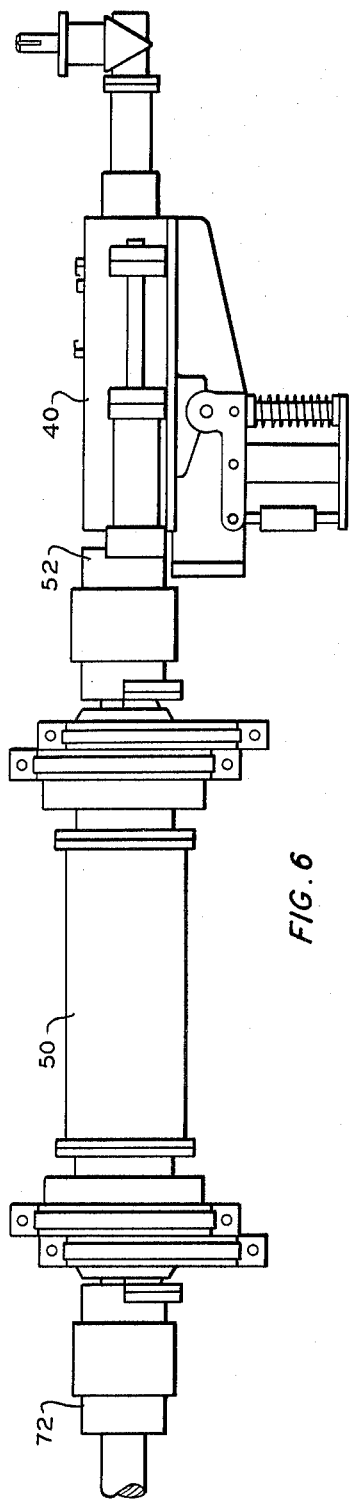
FIGURE 6 is an overall elevational view, partly in section of the lay-shaft assembly of the invention.

An over-all view of the assembly of FIGURES 2, 3, 4 and 5 is shown in FIGURE 6 and in FIGURE 8.

Referring now to FIGURE 7, and also to FIGURE 2, the emergency shutdown device will be described. An air cylinder 37, shown in FIGURE 7, contains a piston 82 and air inlet port 83, which is connected to compressed air conduit 27 (FIGURE 1). The piston 82 of air cylinder 37 is connected to housing 40 by a bracket means 84 so that when air is introduced into port 83, piston 82 moves to the right against stop member 85 carrying with it bracket 84 and housing 40. Air cylinder 38, having piston 82' and bracket 84', operates simultaneously with air cylinder 81 because air is admitted simultaneously into ports 83 and 83'. When air is admitted into ports 83 and 83', air is simultaneously introduced into air cylinder 36 (FIGURE 2), causing piston 86 to rise, thus lowering roller 87 and releasing catch member 88 so that housing 40 can be moved to the right by air cylinders 37 and 38. Thus, movement of housing 40 to the right will rotate the sleeve 59 of FIGURE 4 so as to close the steam inlet valves to the engine regardless of the relative positions of those valves. This emergency shut-down device must be reset manually against the compression of spring 89 when the air pressure has been exhausted from the air cylinders 36, 37 and 38 and the emergency has passed.

The operation of the speed control system as illustrated in the drawing is described herewith. Engines A and B are synchronized manually by known means and are then connected to the control mechanism as illustrated in FIGURE 1. The desired speed of the engines is then regulated by manipulation of knob 31 so that housing 32 is raised or lowered by the matching threads of housing 32 and those of the shaft attached to knob 31. A situation where engine speed is to be increased will be considered and therefore housing 32 will be raised until switch 14 is actuated by contactor 12 on drive yoke 11 of governor 10. Motor 21 is actuated and flexible shafts 33 and 33a are rotated so as to rotate threaded shaft 42 in engine A and a similar shaft in engine B. The operation is substantially identical in each engine and therefore the operation of engine A will be now described. Shaft 42 is rotated so as to advance (toward the left, as shown in FIGURE 2) sleeve 43 and lay shaft 44 which is rotatably secured in sleeve 43. As lay shaft 44 is advanced, the sleeve 59 (FIGURE 4) is advanced (to the left) and housing 50 is caused to rotate with respect to sleeve 49 as the pin 63 follows groove 64 in the periphery of sleeve 59. The housing 50 is connected by means of flanges 58 and 67 to the cam followers 57 and 68 so that rotation of the housing 50 changes the positions of cam followers 57 and 68 on eccentric cams 56 and 69, respectively, so as to increase the size of the opening of the steam inlet valve ports and thus to increase the speed of the engine. The shaft 44 continues to advance and housing 50 continues to revolve about sleeve 59 until contactor 12 of governor 10 is no longer in contact with switch 14.

The engines are slowed down by reversing the process by rotating knob 31 to lower housing 32 until contactor 12 contacts and closes switch 13, causing motor 21 to operate in the opposite direction and thus causing lay shaft 44 to move to the right instead of the left.

Limit switches 49 and 46 in housing 40 (FIGURES 2 and 7) open the power circuit to motor 21 when operated by contactor 47 and thus stop motor 21 when the threaded shaft 42 has moved sleeve 43 to the desired limit of travel in either direction.

The emergency shut-down feature of this device is actuated if engine speed increases to a point where contactor 18 on governor 10 contacts and closes switch 19 so as to activate solenoid valve 26 and admit compressed air to compressed air cylinders 36, 37 and 38 and corresponding air cylinders on the other engines in the combination. The emergency shut-down feature can also be activated by a button or switch on the control panel so as to activate solenoid valve 26. When compressed air is admitted to the air cylinder 36, the piston 86 (see FIGURE 2) rises so as to lower roller 87 against the compression of spring 89 and thus release catch member 88 so that the housing 40 and the pistons of air cylinders 37 and 38 can move to the right. When air is introduced into air cylinder 36, air is simultaneously introduced into air cylinders 37 and 38 (see FIGURE 7) so that the pistons of these cylinders, being attached to housing 40, move the entire housing assembly to the right, carrying with it lay shaft 44 so as to close completely the steam inlet valves to the engine. The flexible shafts 33 permit freedom of movement of the housing 40. The emergency shut-down device is reset manually by pushing the housing 40 assembly to the left until the roller 87 is secured in catch member 88.

The system as described and illustrated has been used successfully to synchronize Erie City reciprocating steam engines operating electrical generators with two steam engines attached to each generator shaft.

Although this device has been described with reference to the simultaneous speed control of a plurality of reciprocating steam engines, it can be employed in any situation where it is desired to impart a measure of rotational motion to one of a plurality of coaxially disposed members being rotated at the same speed. For example, the device can be applied to changing the pitch of airplane propellers or helicopter rotors while the propellers or rotors are being operated.

Reasonable variations and modifications are possible within the scope of this disclosure without departing from the spirit and scope of the invention.

That which is claimed is:

1. A device for simultaneously adjusting the speed of a plurality of mechanically synchronized reciprocating steam engines each having a lay shaft sleeve rotated thereby and a steam inlet valve operated by an eccentric on said lay shaft sleeve comprising
    (1) a governor operated by the rotating lay shaft sleeve of one of said engines;
    (2) a reversible electric motor;
    (3) a switch connected to said motor and to said governor to operate said motor in one direction when the governor slows down and to operate said motor in the other direction when the governor speeds up; and each of said engines having
    (4) a lay shaft positioned in the lay shaft sleeve so as to rotate fixedly with the lay shaft sleeve and longitudinally movable in the lay shaft sleeve;
    (5) a non-rotatable internally threaded, longitudinally movable housing operatively connected to said lay shaft;
    (6) a longitudinally fixed, externally threaded shaft engaging the threads of said housing and operatively connected to said reversible motor so as to move the housing and lay shaft longitudinally;
    (7) an externally spirally grooved sleeve encircling said lay shaft sleeve, secured to said lay shaft so as to rotate with said lay shaft and movable longitudinally with respect to said lay shaft sleeve; and (8) a longitudinally fixed second housing encircling said spirally grooved sleeve, keyed to the groove in the spirally grooved sleeve and operatively connected to said eccentric so that the second housing and eccentric revolve about the lay shaft when the lay shaft is moved longitudinally to change the setting of the steam inlet valve.

2. The device of claim 1 having in combination a fluid operated piston operatively connected to said internally threaded, longitudinally movable housing; valve means to admit fluid pressure to said piston; and means connected to said valve and to said governor to admit fluid to said piston when said engine speed exceeds a desired value so as to move said housing and lay shaft to close said steam inlet valves and stop said engines.

3. A device for simultaneously adjusting the speed of a plurality of mechanically synchronized reciprocating steam engines each having a lay shaft sleeve rotated thereby and a steam inlet valve operated by an eccentric on said lay shaft sleeve comprising (1) a governor operated by the rotating lay shaft sleeve of one of said engines; each of said engines having (2) a lay shaft positioned in the lay shaft sleeve so as to rotate fixedly with the lay shaft sleeve and longitudinally movable in the lay shaft sleeve;

(3) an externally spirally grooved sleeve encircling said lay shaft sleeve, secured to said lay shaft so as to rotate with said lay shaft and movable longitudinally with respect to said lay shaft sleeve;

(4) a longitudinally fixed housing encircling said spirally grooved sleeve, keyed to the groove in the spirally grooved sleeve and operatively connected to said eccentric so that the housing and eccentric revolve about the lay shaft when the lay shaft is moved longitudinally to change the setting of the steam inlet valve; and (5) means operatively connected to said governor and said lay shaft to move said lay shaft longitudinally when the speed of the governor is changed.

4. A device for the simultaneous control of a plurality of reciprocating steam engines each having a lay shaft sleeve rotated thereby, a longitudinally movable lay shaft positioned in said lay shaft sleeve, a steam inlet valve actuated by an eccentric mounted on said lay shaft sleeve, said device comprising a pair of spirally splined, telescoping sleeves encircling said lay shaft sleeve, the inside sleeve being adapted to move longitudinally with said lay shaft and the outside sleeve being adapted to revolve with respect to the inside sleeve when the inside sleeve is moved longitudinally by said lay shaft; means connecting said outside sleeve to said eccentric so as to move said eccentric to change the setting of said steam inlet valve; and means to move the lay shaft longitudinally and simultaneously on each of said engines.

5. The device of claim 4 wherein the means to move the lay shaft longitudinally is a system of gears which converts rotational motion to linear motion.

6. Apparatus for simultaneously adjusting the position of the steam inlet valves of a plurality of synchronized steam engines to increase or decrease the speeds of the engines in unison which comprises, a lay shaft assembly rotated by each of said engines, each lay shaft assembly comprising a lay shaft sleeve encircling a longitudinally movable lay shaft; a spring biased, spirally splined, telescoping assembly comprising a longitudinally fixed outside sleeve and a longitudinally movable inside sleeve operatively connected to said lay shaft so that the outside sleeve rotates with respect to the inside sleeve when the inside sleeve and lay shaft are moved longitudinally; an eccentric mounted on said lay-shaft to rotate with said outside sleeve and operatively connected to said steam inlet valve of said engine; and means to move longitudinally all of said inside sleeves and lay shafts simultaneously and coextensively.

References Cited by the Examiner

UNITED STATES PATENTS

| 2,219,844 | 10/1940 | Lotter et al. | 60—54.5 X |
|---|---|---|---|
| 2,235,990 | 3/1941 | Guttery | 74—59 |
| 2,252,545 | 8/1941 | Benz | 60—97 |
| 2,338,965 | 1/1944 | Parsons | 60—52 X |
| 2,398,198 | 4/1946 | Strang et al. | 74—59 |
| 2,714,290 | 8/1955 | Rachuing | 60—97 |
| 3,004,444 | 10/1961 | Schmidlin et al. | 74—424.8 |
| 3,014,379 | 12/1961 | Wise | 74—424.8 |

FOREIGN PATENTS 11,239   5/1896   Great Britain.

SAMUEL LEVINE, *Primary Examiner.*

ROBERT R. BUNEVICH, *Examiner.*